US010800469B2

United States Patent
Galat

(10) Patent No.: US 10,800,469 B2
(45) Date of Patent: Oct. 13, 2020

(54) LINK ASSEMBLY WITH THREADED MASTER PIN

(71) Applicant: Caterpillar Inc., Deerfield, IL (US)

(72) Inventor: Michael S. Galat, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 188 days.

(21) Appl. No.: 16/040,570

(22) Filed: Jul. 20, 2018

(65) Prior Publication Data

US 2020/0023914 A1   Jan. 23, 2020

(51) Int. Cl.
*B62D 55/21* (2006.01)
*B62D 55/32* (2006.01)

(52) U.S. Cl.
CPC ........... *B62D 55/213* (2013.01); *B62D 55/32* (2013.01)

(58) Field of Classification Search
CPC ...... B62D 55/213; B62D 55/21; B62D 55/28; B62D 55/32
See application file for complete search history.

(56) References Cited

U.S. PATENT DOCUMENTS

| | | | | |
|---|---|---|---|---|
| 2,551,695 A | * | 5/1951 | Oddy | B62D 55/205 305/104 |
| 2,621,981 A | * | 12/1952 | Schick | B62D 55/0887 305/59 |
| 2,893,788 A | * | 7/1959 | Yerian | B62D 55/213 305/202 |
| 2,970,866 A | * | 2/1961 | Horste | B62D 55/0887 305/106 |
| 4,108,502 A | * | 8/1978 | Wohlford | B62D 55/0887 305/118 |
| 4,265,084 A | | 5/1981 | Livesay | |
| 5,376,055 A | * | 12/1994 | Bauman | F16G 13/06 474/218 |
| 7,614,709 B2 | | 11/2009 | Oertley | |
| 2005/0067897 A1 | * | 3/2005 | James | B62D 55/21 305/193 |
| 2008/0265667 A1 | | 10/2008 | Livesay | |
| 2018/0050385 A1 | | 2/2018 | Wang et al. | |

FOREIGN PATENT DOCUMENTS

| | | | |
|---|---|---|---|
| DE | 112012004817 B4 | | 9/2018 |
| KR | 101032524 B1 | * | 5/2011 |

* cited by examiner

*Primary Examiner* — Kip T Kotter
(74) *Attorney, Agent, or Firm* — Calfee, Halter & Griswold LLP

(57) ABSTRACT

A master link box for use with a link assembly of a work machine is disclosed. The master link box may include first and second master links with first and second threaded pin bores and first and second threaded passages, a master link pin with threads on the outer circumferential surface along a distal portion, and first and second fasteners. The master link pin may be inserted into the master link box through one of the first or second pin bores. The fasteners may be secured in the threaded passages such that the first fastener abuts a proximal portion of the master link pin and the second fastener abuts a distal portion of the master link pin.

20 Claims, 12 Drawing Sheets

LINK ASSEMBLY WITH THREADED MASTER PIN

TECHNICAL FIELD

The present disclosure generally relates to a machine track and related assembly and disassembly strategies, and more specifically to a bolt together machine track and method wherein links are secured by a threaded master pin.

BACKGROUND

A variety of machine tracks have been used for construction, mining and agricultural machines, military vehicles, conveyors and torque transmitting devices for well over a century. In general terms, a machine track consists of an endless chain of track links coupled together and extending about rolling elements. In the case of ground engaging tracks, such as those used to propel mobile machines, a toothed rotating element, commonly known as a drive sprocket, is often used to rotate a track about one or more idlers and a plurality of track rollers supporting the weight of the machine. Such tracks are in widespread use, and have earned a place as indispensable components of many machines operating in rugged environments. The durability, utility and resultant commercial success of tracks used in track-type machines is in large part a result of many decades of research and engineering of their numerous specialized components. While many designs have proven well-suited to rugged off-road environments, where track-type machines typically operate, a drawback to virtually all viable track designs is the difficulty in disassembling or "breaking" the track for service, part replacement or machine disassembly.

One design utilizes pins to couple track links together to form sets of parallel endless track chains. In certain of these designs, a single pin couples together an inboard link and an outboard link in each of the parallel chains. Track shoes coupled with the respective chains provide the elements which engage the ground for propelling the machine. Press fits are often used to provide a robust connection between the pin and the associated track links. To disassemble most tracks having press fits, and particularly those having S-shaped links, a relatively large hydraulic press is typically required to press the pin out of the track. Even after removing the pin, seals used to retain lubricating fluid and protect components from entry of foreign material may resist further disassembly of the track, necessitating the use of an additional hydraulic press to complete track disassembly at a given joint. Great care is often required to avoid damaging the track components during disassembly. Tracks having straight links are often serviced by pulling outboard links off of the ends of track pins rather than pressing out the pins.

Due to the time, care and specialized tools required to disassemble machine track, it has become common to use master links in a track. While master links provide relatively easier disassembly of a track at a given joint, they often still require specialized tools and provide only a single point at which the track can be broken. Master links are also relatively extensively machined parts, and hence expensive, and in some instances can create a weak point in the track.

U.S. Pat. No. 4,108,502, titled "Joint assembly for links of endless track," discloses a threaded pivot pin which joins the leading ends of a first pair of track links with the trailing ends of a second pair of track links. While the disclosed track joint link includes a threaded pivot pin which may secure the pairs of track links by threading the pivot pin through threaded openings in the track links, the track joint lacks securement means which prevent the pivot pin from retracting or backing out of the track links.

SUMMARY

In accordance with aspects of this disclosure, there are provided master link boxes for a continuous track of a work machine. The master link boxes include a left-hand master link having a first end, a second end, a first pin bore extending through the first end, a first link seal bore extending through the second end, a first distal surface, and a first threaded passage extending from the first distal surface to the first pin bore and a right-hand master link having a third end, a fourth end, a second pin bore extending through the third end, a second link seal bore extending through the fourth end, a second a distal surface, and a second threaded passage extending from the second distal surface to the second pin bore. The master link boxes also include a master link pin having a distal portion, a proximal portion, an outer circumferential surface, and threads disposed on the outer circumferential surface. The master link boxes further include a first fastener receivable in the first threaded passage to abut the outer circumferential surface of the master link pin and a second fastener receivable in the second threaded passage to abut the outer circumferential surface of the master link pin.

In accordance with other aspects, there are provided master link boxes for a continuous track of a work machine. The master link boxes include a left-hand master link having a first end, a second end, a first threaded pin bore extending through the first end, and a first link seal bore extending through the second end and a right-hand master link having a third end, a fourth end, a second threaded pin bore extending through the third end, and a second link seal bore extending through the fourth end. The master link boxes also include a master link pin extending through the first threaded pin bore and the second threaded pin bore. The master link pin has a distal portion, a proximal portion, an outer circumferential surface, and threads disposed on the outer circumferential surface of the distal portion. The threads are configured to mate with both the first threaded pin bore and the second threaded pin bore.

In accordance with other aspects, there are provided methods for forming a continuous track for a work machine. The methods include the steps of providing a plurality of track link boxes forming a link assembly having a first end and a second end, providing a master link box between the first end and the second end of the link assembly, the master link box including a left-hand master link having a first pin bore, a first link seal bore, and a first threaded passage, and a right-hand master link having a second pin bore, a second link seal bore, and a second threaded passage, a master link bushing, securing the first and second link seal bores to the first end of the link assembly, securing a master link bushing between two link seal bores of a track link box defining the second end of the link assembly, aligning the first pin seal bore and second pin bore with the master link bushing, inserting a master link pin through one of the first pin bore and the second pin bore, through the master link bushing, and into the other of the first pin bore and second pin bore, inserting a first fastener into a first threaded passage of the left-hand master link such that the first fastener abuts the master link pin, and inserting a second fastener into a second threaded passage of the right-hand master link such that the second fastener abuts the master link pin.

BRIEF DESCRIPTION OF THE DRAWINGS

Further features and advantages of the invention will become apparent from the description of embodiments using the accompanying drawings. In the drawings.

While the following detailed description will be given with respect to certain illustrative embodiments, it should be understood that the drawings are not necessarily to scale and the disclosed embodiments are sometimes illustrated diagrammatically and in partial views. In addition, in certain instances, details which are not necessary for an understanding of the disclosed subject matter or which render other details too difficult to perceive may have been omitted. It should therefore be understood that this disclosure is not limited to the particular embodiments disclosed and illustrated herein, but rather to a fair reading of the entire disclosure and claims, as well as any equivalents thereto.

DETAILED DESCRIPTION

Figure 1:
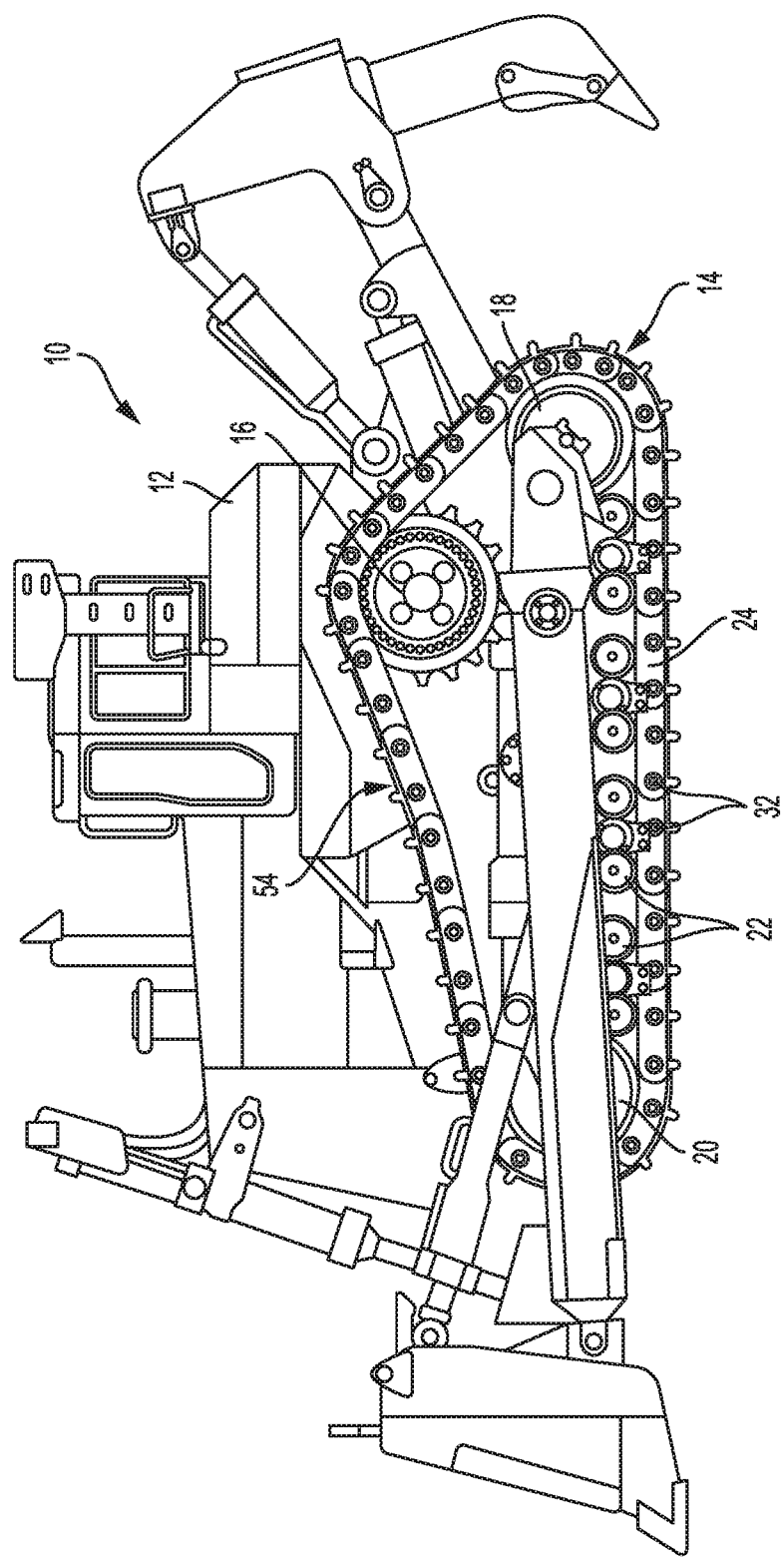
FIG. 1 is a side diagrammatic view of a machine according to an exemplary embodiment.

Referring to FIG. 1, there is shown a work machine 10 according to one embodiment. The work machine 10 may include a frame 12 and one or more tracks 14 coupled with the frame 12. In the illustrated embodiment, the work machine 10 is a high drive track-type tractor, including a pair of identical tracks 14 disposed on opposite sides of the frame 12. However, it will be appreciated that the work machine 10 may be any other machine with a continuous track. For example, the work machine 10 may be a half-track machine, an excavator, a tank, some other type of mobile machine, or even a stationary machine such as a conveyor might be constructed according to the teachings set forth herein.

Figure 2:
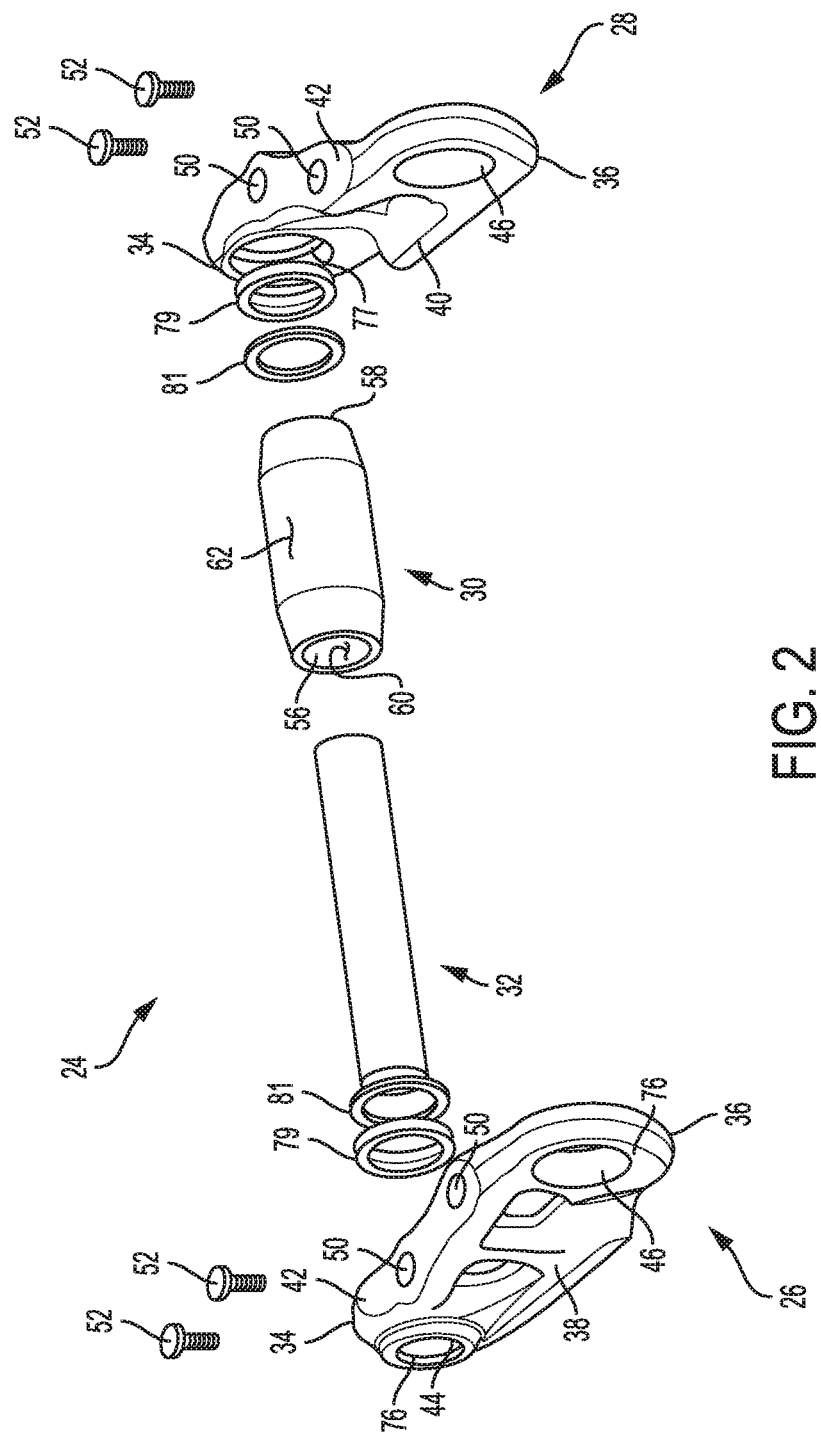
FIG. 2 is an exploded perspective view of a track link box.

Each track 14 may comprise an endless track extending about a plurality of rotatable elements, including, for example, a drive sprocket 16, a back idler 18 and a front idler 20, as well as a plurality of track rollers 22. The track 14 may further include a plurality of coupled together track link boxes 24 forming two parallel track chains, coupled with track shoes in a conventional manner. In FIG. 2, an exemplary track link box 24 is shown in an exploded view including a first or left-hand track link 26, a second or right-hand track link 28, a bushing 30 disposed between the left-hand and right-hand track links 26, 28, and a track link pin 32 which may join the left-hand track link 26, the bushing 30, and the right-hand track link 28.

Figure 3:
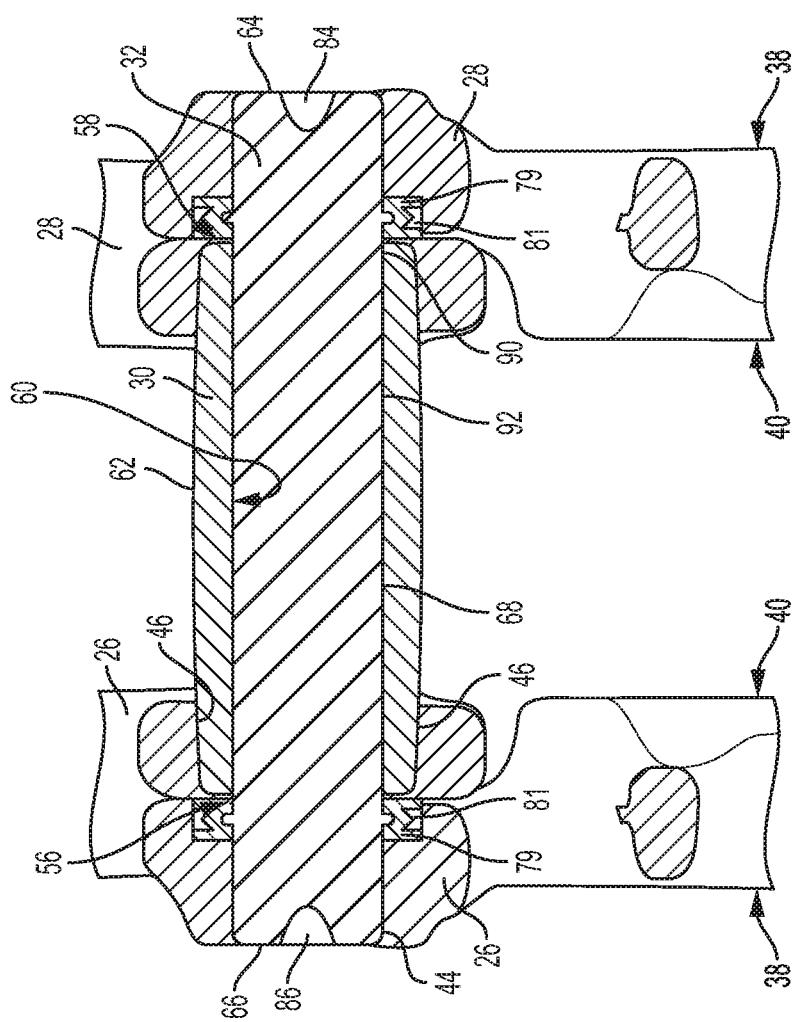
FIG. 3 is a cross-sectional view of a first exemplary track link pin secured in the master link box of FIG. 2.
Figure 4:
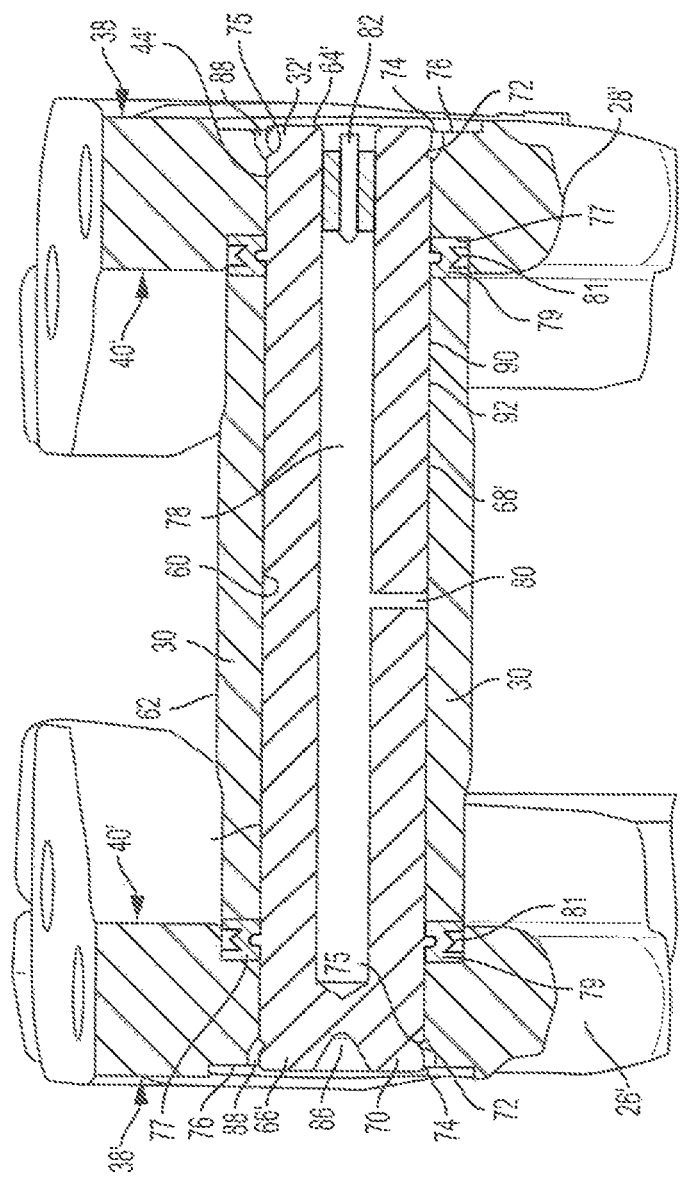
FIG. 4 is a cross-sectional view of a second exemplary track link pin with a longitudinal bore and side fluid passage secured in the master link box of FIG. 2.

Referring to FIGS. 2-4, the left-hand and right-hand track links 26, 28 are generally elongated ovals having a first end 34, a second end 36, an exterior or distal surface 38, an interior or proximal surface 40, and a top surface 42. The track links 26, 28 may be substantially mirror images of one another and are oriented substantially parallel to one another in the track link box 24. In the illustrated embodiment, the left-hand and right-hand track links 26, 28 are off-set links with the first end 34 being flared or tapered distally outward and the second end 36 being flared or tapered distally inward from the remainder of each track link 26, 28. In a preferred embodiment, the first end 34 flares outwardly and the second end 36 flares inwardly to an extent such that the second ends 36 of one pair of track links 26, 28 may be disposed between the first ends 34 of an adjacent pair of track links 26, 28 when the adjacent link boxes 24 are aligned.

While the track links 26, 28 have been described as off-set links, the track links 26, 28 may take a variety of shapes and configurations. For example, the track links 26, 28 may be straight links with alternating pairs of inside and outside links, S-shaped links, or any other suitable configuration of links.

The track links 26, 28 may have a first or pin bore 44 extending through the first end 34 and a second or link seal bore 46 extending through the second end 36. The pin bore 44 may be a circular bore sized to receive a portion of the track link pin 32 and the link seal bore 46 may be a circular bore sized to receive a portion of the bushing 30. In a preferred embodiment, the pin bore 44 and link seal bore 46 are unthreaded.

The track links 26, 28 may also include one or more track shoe bores 50 disposed in the top surface 42 and extending partially into the track links 26, 28. The track shoe bores 50 may each be threaded and sized to at least partially receive a track shoe fastener 52 to secure a track shoe 54 (shown in FIG. 1) to the track links 26, 28. In a preferred embodiment, the track shoe fastener 52 is a threaded bolt which extends through the track shoe 54 and into the track shoe bores 50 to secure the track shoe 54 to the track links 26, 28.

As shown in FIGS. 2-4, the bushing 30 is a generally hollow cylinder having a first opening 56, a second opening 58, a cylindrical inner surface 60, and a cylindrical outer surface 62. The cylindrical inner surface 60 may be a substantially smooth bore and the cylindrical outer surface 62 is tapered radially inward near the first and second openings 56, 58 such that the ends of the bushing 30 may be securely received within the link seal bores 46 of the track links 26, 28, as detailed below. The cylindrical inner surface 60 defines a bore having an inner diameter which may be sized to receive the track link pin 32 and allow the track link pin 32 to rotate within the cylindrical inner surface 60.

As shown in FIGS. 2-4, the track link pin 32 is a substantially cylindrical rod having a distal end 64, a proximal end 66, and an outer circumferential surface 68. The track link pin 32 is sized and shaped to be at least partially inserted through the pin bores 44 of the track links 26, 28 and through the cylindrical inner surface 60 of the bushing 30, to secure the track links 26, 28 of one track link box 24 to the track links 26, 28 of a subsequent track link box.

As shown in FIG. 4, an embodiment of a track link pin 32' may have a flared end or radial projection 70 projecting radially outward from an outer circumferential surface 68' at or near a proximal end 66'. The radial projection 70 may have a projection surface 72 extending outwardly from the outer circumferential surface 68' and a radial outer surface 74 substantially concentric with the outer circumferential surface 68' and extending between the projection surface 72 and the proximal end 66'.

As shown in FIG. 4, some embodiments of a left-hand and a right-hand track link 26', 28' may include a lateral annular recess 76 disposed around pin bores 44' in the links 26' 28' and inset from a distal surface 38' and a medial annular recess 77 disposed around the pin bores 44' and inset from a proximal surface 40'. The lateral annular recess 76 is sized to receive the radial projection 70 of the track link pin 32', as detailed below. The lateral annular recess 76 may be substantially the same size or slightly larger than the radial projection 70 and the lateral annular recess 76 may be inset from the distal surface 38' to substantially the same depth as the length of the radial outer surface 74 between the projection surface 72 and the proximal end 66' of the track link pin 32'. The medial annular recess 77 may be sized to partially receive the bushing 30. The medial annular recess 77 may be substantially the same width or slightly larger than the cylindrical outer surface 62 of the bushing 30 near the first and/or second opening 56, 58 of the bushing 30. The medial annular recess 77 may also be recessed from the proximal surface 40' such that a pressed ring 79 and a seal 81 may be disposed between the bushing 30 and each of the track links 26', 28' when the track link box 24 is assembled, as detailed below. The pressed ring 79 may be an expandable ring which exerts a biasing force opposite the directions it is compressed, as detailed below, and the seal 81 is a semi-compressible material which may provide a fluid seal. In a preferred embodiment, the pressed ring 79 is a powdered metal and the seal 81 is a rubber or polycarbonate.

The track link pin 32' may also include one or more annular grooves 75 in the outer circumferential surface 68' near the distal and/or proximal ends 64', 66'. The annular grooves 75 may be recessed from the outer circumferential surface 68'. In the illustrated embodiment, the annular grooves 75 are rounded. However, it will be appreciated that other embodiments are contemplated. For example, the annular grooves 75 may be triangular, rectangular, or any other suitable shape.

As shown to FIG. 4, the track link boxes 24 may include one or more retaining rings 88 disposed in the annular grooves 75 of the track link pin 32'. The retaining rings 88 may be disc-shaped and sized to securely fit in the annular grooves 75 of the track link pin 32'. The retaining rings 88 may be larger than the pin bores 44' of the track links 26', 28'. When the track link pin 32' is inserted in the track link box 24, the retaining rings 88 may be disposed in the annular grooves 75 of the track link pin 32' to retain the track link pin 32' in the track link box 24. In a preferred embodiment, the retaining rings 88 are press fit into the annular grooves 75.

The track link pin 32' may further include a longitudinal bore 78 extending longitudinally into the track link pin 32' from the distal end 64' and a side fluid passage 80 extending radially outward from the longitudinal bore 78 to the outer circumferential surface 68'. As such, the outer circumferential surface 68', the side fluid passage 80, the longitudinal bore 78, and the distal end 64' of the track link pin 32' may be fluidly connected. The track link pin 32' may also include a cap 82 which may be inserted into the longitudinal bore 78 from the distal end 64' to close off or otherwise seal the longitudinal bore 78 from the distal end 64'. In a preferred embodiment, the cap 82 is a screw or other fastener which may be threaded or otherwise secured in the longitudinal bore 78 from the distal end 64' to seal off the longitudinal bore 78.

While the track link pin 32' has been described as having one or more annular grooves 75 which may receive a retaining ring 88, a longitudinal bore 78, a side fluid passage 80, and a cap 82, other embodiments may be contemplated. For example, if grease is used as a lubricant within the track link box 24, as detailed below, the track link pin 32' may have a substantially smooth outer circumferential surface 68' without annular grooves 75 and the track link box 24 may not include retaining rings 88 to secure the track link pin 32' in the track link box 24, as illustrated in FIG. 3. Also, if grease is used as a lubricant within the track link box 24, the track link pin 32' may be a substantially solid rod without any internal passages or bores or a cap.

Turning back to FIG. 3, the track link pin 32 may also include a first counterbore 84 disposed in the distal end 64 and/or a second counterbore 85 disposed in the proximal end 66. The first and second counterbores 84, 85 may extend partially into the track link pin 32 and may make the track link pin 32 easier to assemble or may prevent dirt or other debris from collecting in the track link box 24. In the illustrated embodiment, the first and second counterbores 84, 85 are relatively conical. However, it will be appreciated that other embodiments are contemplated. For example, the first and/or second counterbores 84, 85 may be rounded, triangular, rectangular, pentagonal, or any other suitable shape.

While the track link pin 32 has been described as having a first counterbore 84 disposed in the distal end 64, it will be appreciated that other embodiments are contemplated. For example, if the track link pin 32 includes a longitudinal bore 78, a side fluid passage 80, and a cap 82, the track link pin 32 may not have a first counterbore 84 disposed in the distal end 64.

Figure 5:
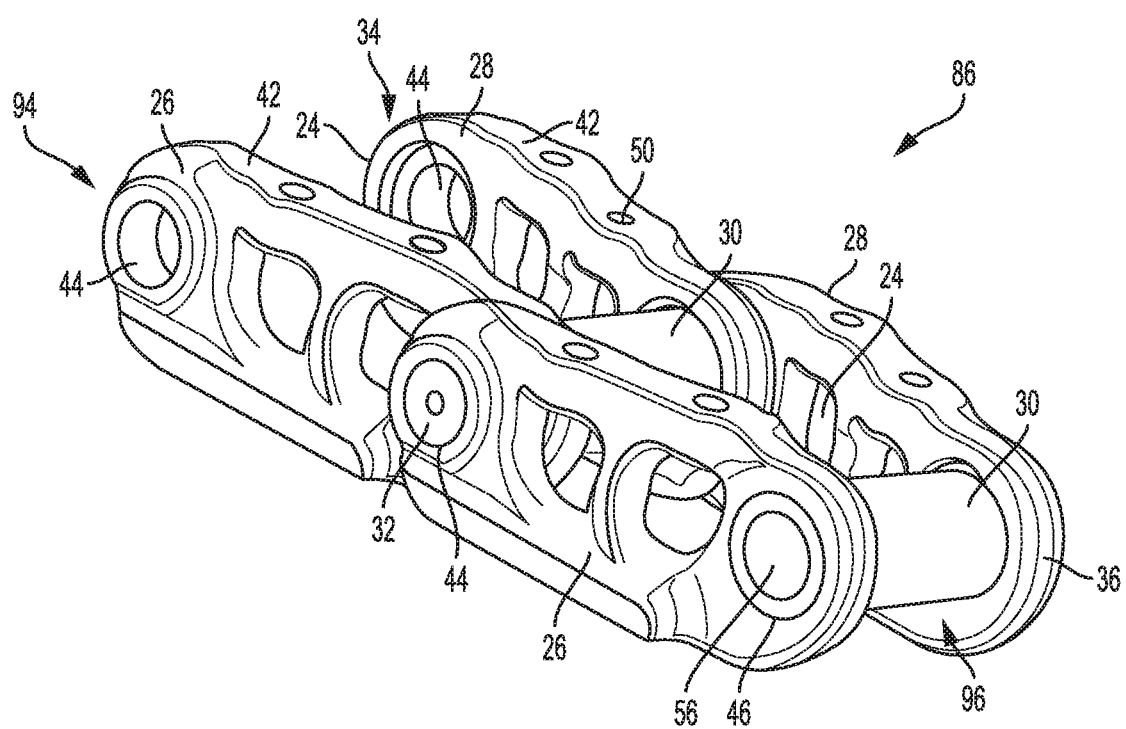
FIG. 5 is a perspective view of a link assembly.

As shown in FIG. 5, a first or inside pair of track links 26, 28 may be joined to a second or outside pair of track links 26, 28 to form a link assembly 86. The link seal bores 46 of the first or inside pair of track links 26, 28 may be fittingly secured to the cylindrical outer surface 62 of the bushing 30 at or near the first and second openings 56, 58 of the bushing 30. In a preferred embodiment, the link seal bores 46 are press fit onto the bushing 30 by use of a tool or machine, such as a hydraulic press. However, the link seal bores 46 of the track links 26, 28 may be secured to the bushing 30 by any other suitable means.

The pin bores 44 of the second or outside pair of track links 26, 28 may then be aligned with the first and second openings 56, 58 of the bushing 30 and/or the link seal bores 46 of the first or inside pair of track links 26, 28. The track link pin 32 may then be inserted through the pin bore 44 of either the left-hand or right-hand track link 26, 28 of the outside pair, through the bushing 30, and into the pin bore 44 of the other track link 26, 28 of the outside pair. The track link pin 32 may be inserted through the pin bore 44 of either the left-hand or right-hand track link 26, 28 of the outside pair, through the bushing 30, and into the pin bore 44 of the other track link 26, 28 of the outside pair until the projection surface 72 of the track link pin 32 abuts the annular recess 76 of the track link 26, 28 through which the track link pin 32 was first inserted. The track link pin 32 may be press-fit into the pin bores 44 and bushing 30 by use of a tool or machine, such as a hydraulic press. However, the track link pin 32 may be secured or otherwise inserted through the pin bores 44 and the bushing 30 by any other suitable means. In a preferred embodiment, the track link pin 32 is secured, if at all, only to the pin bores 44 of the outside pair track links 26, 28 such that the track link pin 32 and outside pair of track links 26, 28 secured to the track link pin 32 may rotate independently from the bushing 30 and the inside pair of track links 26, 28 secured to the bushing 30 about an axis extending through the track link pin 32. Once the track link box 24 is secured to an adjacent track link box 24, track shoes 54 may be secured to the top surface 42 of the track links 26, 28 by inserting the one or more track shoe fasteners 52 through the track shoe 54 and into the one or more track shoe bores 50.

Turning back to FIGS. 3-4, the link seal bores 46 of the first or inside pair of track links 26, 28, the ends of the bushing 30, the one or more pressed rings 79, the one or more seals 81, and the outer circumferential surface 68 of the track link pin 32 may form a fluid seal when the track link pin 32 is inserted through the link seal bores 46 and the bushing 30. The pressed rings 79 and seals 81 may be disposed such that the seals 81 abut the bushing 30 and the pressed rings 79 bias the seals 81 into a sealing abutment with the bushing 30 while simultaneously protecting the seals 81 from being crushed between the bushing 30 and the track links 26, 28. The pressed rings 79 and seals 81 are sized to securely fit around the track link pin 32 when the track link pin 32 is inserted into the track link box 24. As a result, when the track link pin 32 is inserted in the track link box 24, a sealed link cavity 90 is formed between the cylindrical inner surface 60 of the bushing 30, the outer circumferential surface 68 of the track link pin 32, the pressed rings 79, and the seals 81.

Before the track link pin 32 is fitted into the pin bores 44 and bushing 30, a lubricant 92, such as grease, oil, or any other lubricant known in the art, may be inserted into the sealed link cavity 90 to facilitate the rotation of the track link pin 32 within the bushing 30, reduce friction and/or wear of the bushing 30 and/or track link pin 32, and reduce heat generation.

In a first exemplary embodiment, the lubricant 92 may be inserted into the longitudinal bore 78 of the track link pin 32 such that the lubricant 92 flows through the side fluid passage 80 into the sealed link cavity 90. After sufficient lubricant 92 has been added into the sealed link cavity 90, the cap 82 may be inserted into the longitudinal bore 78 to seal the sealed link cavity 90 to seal the longitudinal bore 78.

In second exemplary embodiment where the track link pin 32 does not have a longitudinal bore or side fluid passage, the lubricant 92 may be inserted into the sealed link cavity 90 and/or the bushing 30 before the track link pin 32 is inserted into the track link box 24 or after the track link pin 32 has been partially inserted into the track link box 24 but before the track link pin 32 is fully inserted into the track link box 24. As such, when the track link pin 32 is fully inserted in the track link box 24, the lubricant 92 will be fluidly sealed within the sealed link cavity 90 of the track link box 24.

After the track link pin 32 has been inserted through the pin bore 44 of one of the track links 26, 28, the bushing 30, and the other track link 26, 28, the retaining rings 88 may be secured into the annular grooves 75 of the track link pin 32 which are disposed beyond the distal surface 38 of the track link 26, 28 of the outside pair through which the track link pin 32 was inserted second when the track link pin 32 was placed in the track link box 24. As the retaining rings 88 are larger than the pin bores 44 of the track links 26, 28, the retaining rings 88, when secured in the annular groove 75, may prevent the distal end 64 of the track link pin 32 from being retracted through the pin bore 44 of the track link 26, 28 through which the track link pin 32 was inserted second when the track link pin 32 was placed in the track link box 24. In such a manner, the retaining ring 88 may secure the track link pin 32 in the track link box 24.

Turning back to FIG. 5, the process of joining track links 26, 28 together to form the link assembly 86 may be repeated using additional pairs of track links 26, 28, bushings 30, and track link pins 32 until the link assembly 86 is substantially the length of the continuous track 14. In a preferred embodiment, the process is repeated until the link assembly 86 is one track link box 24 short of the desired length of the continuous track 14.

The resulting link assembly 86 is a substantially straight chain of track link boxes 24 and has a first or front end 94 and a second or rear end 96. In a preferred embodiment, the front end 94 of the link assembly 86 consists of the first ends 34 of the track links 26, 28 of the front link box 24 such that the pin bores 44 of the front track links 26, 28 are exposed and the rear end 96 of the link assembly 86 consists of the second ends 36 of the track links 26, 28 of the rear link box 24 such that link seal bores 46 of the rear track links 26, 28 are fit together by a bushing 30 and may be aligned and joined with the pin bores 44 of subsequent track links 26, 28. It will be appreciated that the terms front end and rear end in relation to the link assembly 86 are descriptions used to clarify the illustrations and the front end 94 of the link assembly 86 may be disposed at the rear of the link assembly 86 and the rear end 96 of the link assembly 86 may be disposed at the front of the link assembly 86

Figure 6:
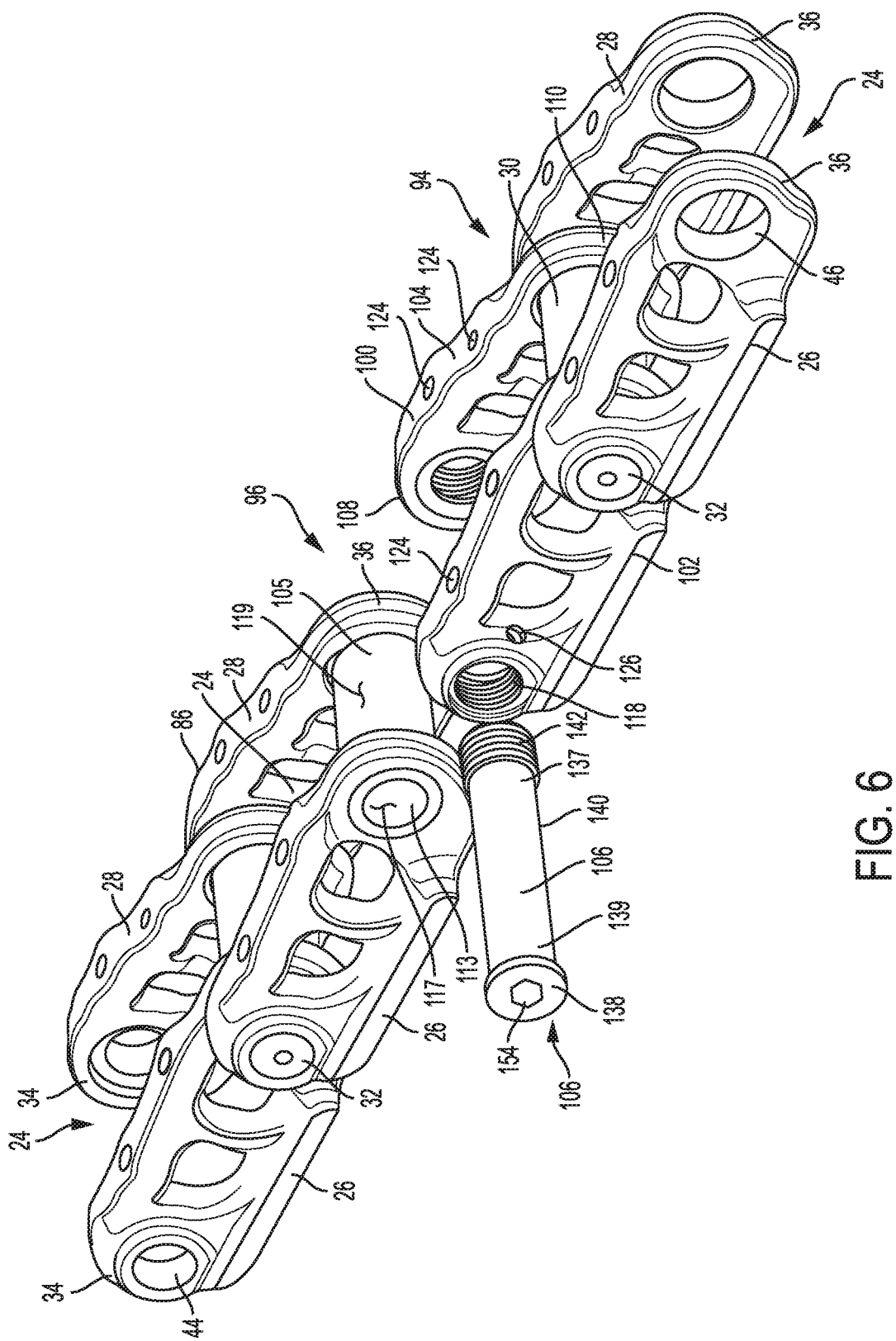
FIG. 6 is a perspective view of an exemplary master link box joined to a front end of a link assembly.
Figure 7:
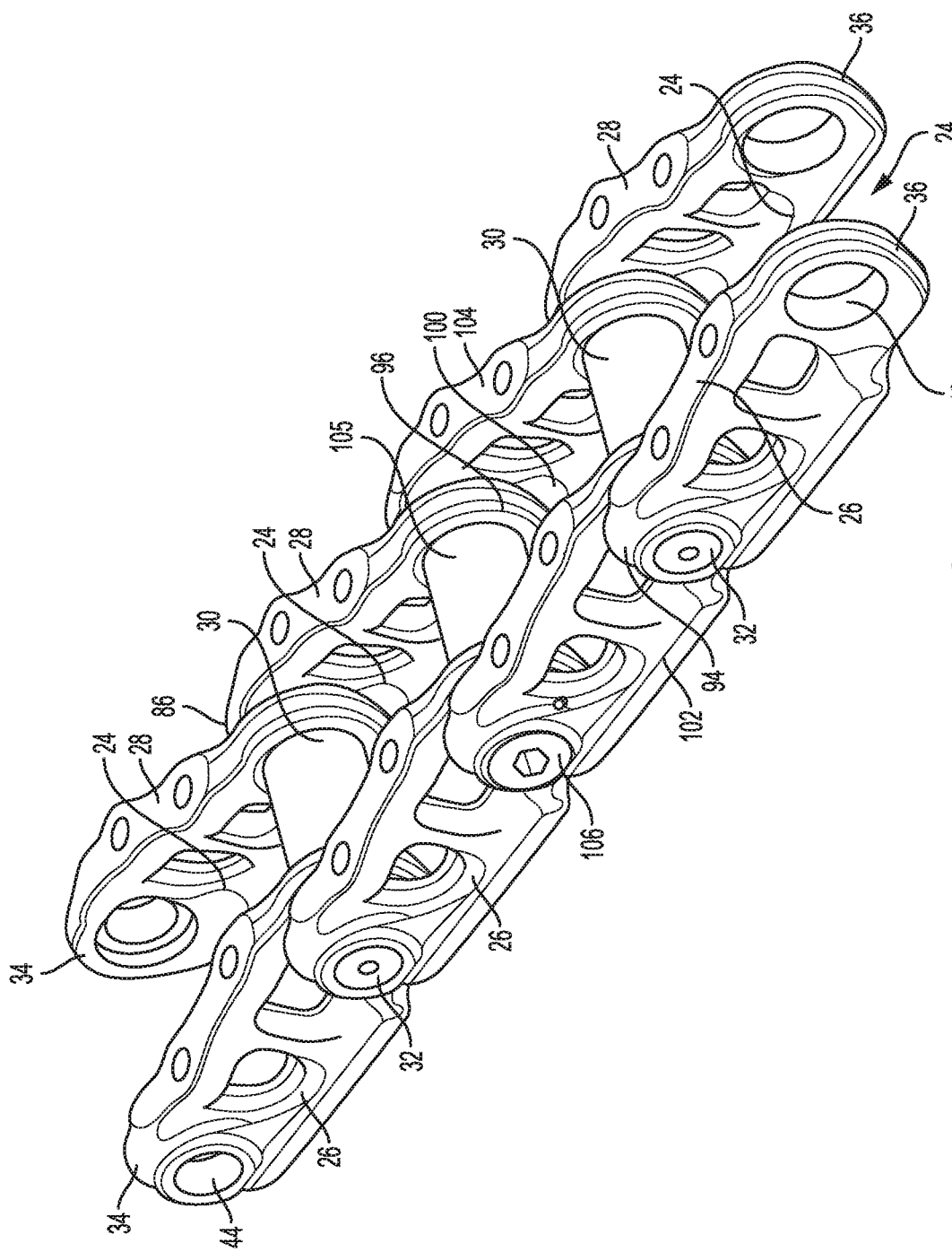
FIG. 7 is a perspective view of an exemplary master link box joining the front and rear ends of a link assembly.
Figure 8:
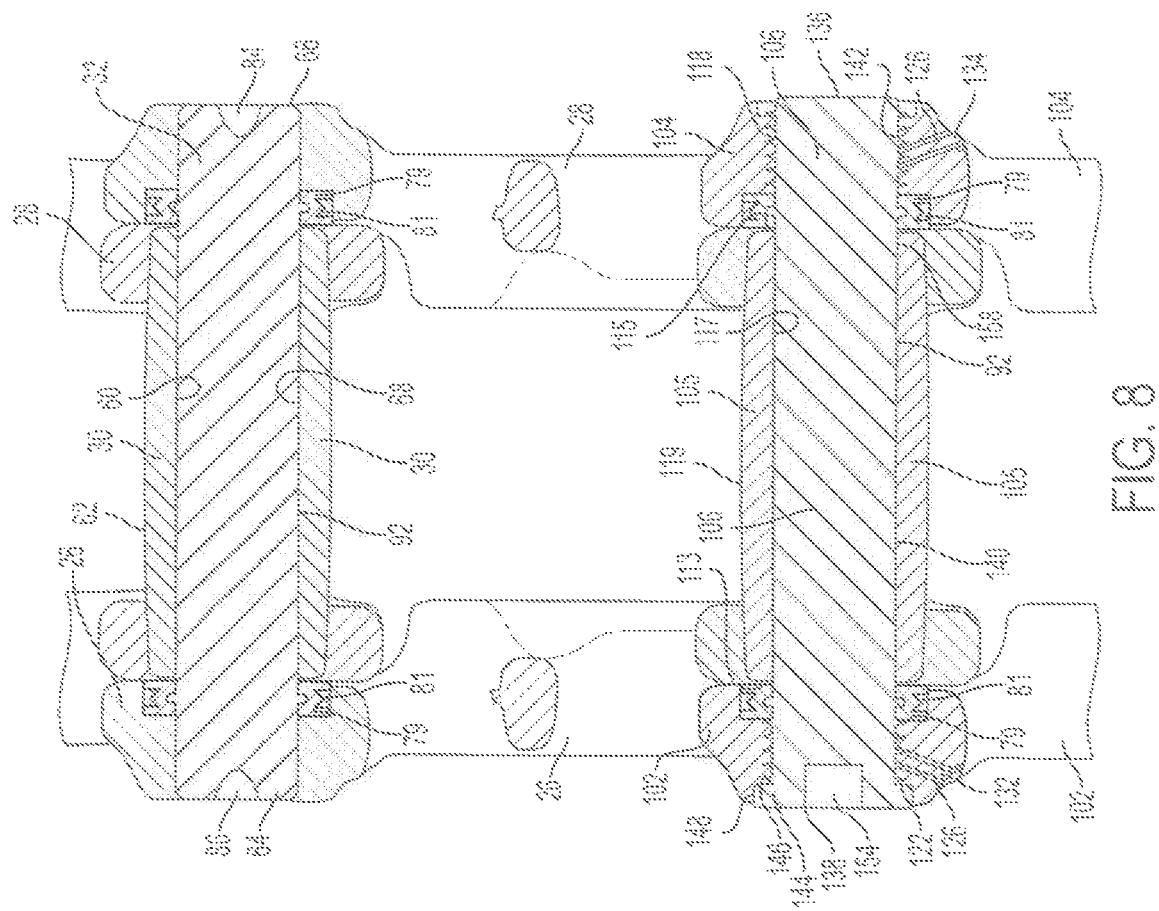
FIG. 8 is a cross-sectional view of an exemplary master link box joined to a link assembly.
Figure 9:
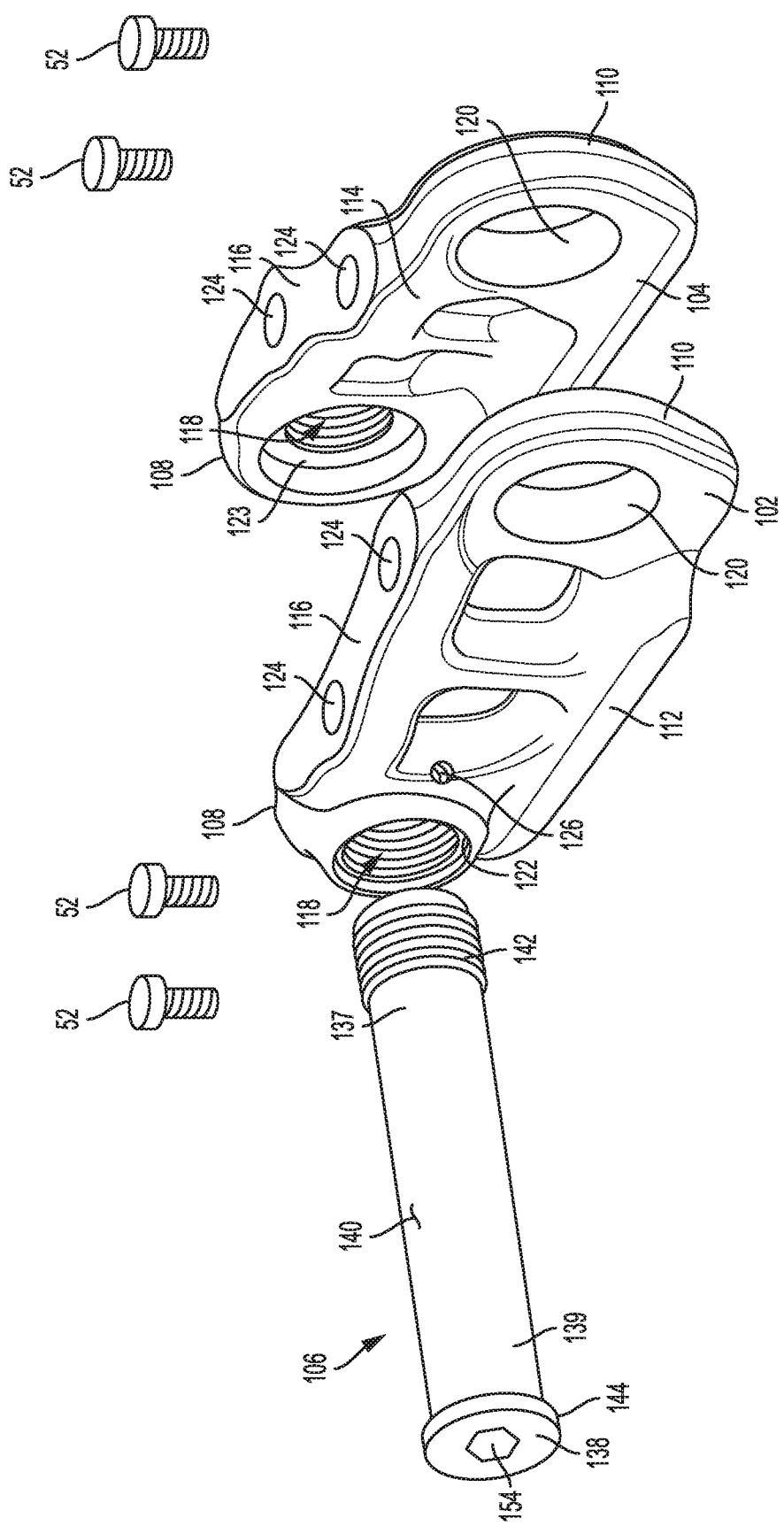
FIG. 9 is an exploded perspective view of an exemplary master link box.

Turning now to FIGS. 6-8, a master link box 100 may be joined to the front and rear ends 94, 96 of the link assembly 86 to form a continuous track 14. The master link box 100 may include a first or left-hand master link 102, a second or right-hand master link 104, a master link bushing 105, and a master link pin 106.

Referring to FIGS. 9-12, exemplary left- and right-hand master links 102, 104 are depicted. The master links 102, 104 are similar in size and shape to the track links 26, 28. Similarly to the track links 26, 28, the master links 102, 104 each have a first end 108 that is flared outwardly, a second end 110 that is flared inwardly, an exterior or distal surface 112, an interior or proximal surface 114, a top surface 116, a pin bore 118 extending through the first end 108, a link seal bore 120 extending through the second end 110, a lateral annular recess 122 disposed around the pin bores 118 on the distal surface 112, a medial annular recess 123 disposed around the pin bore 118 and inset from the proximal surface 114, and at least one track shoe bore 124 in the top surface 116. The one or more track shoe bores 124 in the top surface 116 may extend partially into the master track links 102, 104 which may threadingly receive track shoe fasteners 52 to secure the track shoe 54 (FIG. 1) to the master link box 100.

In a preferred embodiment, the continuous track 14 consists of a plurality of track link boxes 24 and one master link box 100. However, it will be appreciated that other embodiments are contemplated. For example, the master links 102, 104 may be used instead of the track links 26, 28 in the remainder of the link assembly 86 or the link assembly 86 may be any other combination of track link boxes 24 and master link boxes 100.

The pin bores 118 of the master links 102, 104 are threaded and the link seal bores 120 of the master links 102, 104 are smooth or unthreaded. The size and threads of the pin bores 118 of the master links 102, 104 may be such that the pin bores 118 may threadingly receive at least a portion of the master link pin 106. The inside diameter of the link seal bores 120 of the master links 102, 104 may be substantially the same size as the link seal bores 46 of the track links 26, 28 and/or the cylindrical inner surface 60 of the bushing 30 secured between the link seal bores 46 of the track links 26, 28 such that the link seal bores 118 of the master links 102, 104 may be secured around a bushing 30, as detailed below.

As shown in FIGS. 9-12, the master links 102, 104 may also include a threaded passage 126 connecting the distal surface 112 of the master link 102, 104 to an inner surface of the pin bore 118. The threaded passage 126 has a surface opening 128 in the distal surface 112 of the first end 108 of the master link 102, 104 between the pin and link bores 118, 120 and a pin opening 130 in the inner surface of the pin bore 118. The threaded passage 126 of the master links 102, 104 are sized and threaded to receive a first fastener 132 a second fastener 134. In a first embodiment, the size and threads of the threaded passage 126 of each master link 102, 104 and the size and threads of the first and second fasteners 132, 143 are such that each threaded passage 126 may receive either the first or second fastener 132, 134. In another embodiment, the threaded passages 126 of the master links 102, 104 are sized such that the first and second fasteners 132, 134 may extend at least partially through the threaded passage 126 of either master link 102, 104. In the illustrated embodiment, the first fastener 132 is a screw or bolt with an end terminating at a point or is otherwise sharpened and the second fastener 134 is a screw or bolt with a flat or dull end.

While the threaded passages 126 of the master links 102, 104 are depicted as being substantially similar, it will be appreciated that that the threaded passages 126 of the first and second master links 102, 104 may be different. For example, the threaded passages 126 of the first and second master links 102, 104 may be sized differently, oriented in non-mirror positions, or have different threads.

As shown in FIG. 6, the master link bushing 105 may be a substantially hollow cylinder having a first opening 113, a second opening 115 (not shown) disposed opposite the first opening, a cylindrical inner surface 117, and a cylindrical outer surface 119. The cylindrical inner surface 117 may be a substantially smooth bore and the cylindrical outer surface 119 may be tapered radially inward near the first and second openings 113, 115 such that the ends of the master bushing 30 may be securely received within the link seal bores 46 of the track links 26, 28 at the rear end 96 of the link assembly 86, as detailed below. The cylindrical inner surface 117 defines a bore having an inner diameter which may be sized to receive the master link pin 106 and allow the master link pin 106 to rotate within the cylindrical inner surface 117.

The master link bushing 105 of the master link box 100 may be substantially the same as the bushing 30 of the track link boxes 24. However, the master link bushing 105 of the master link box 100 may be different than the bushings 30 of the track link boxes 24.

Referring to FIGS. 9-12, an exemplary master link pin 106 is depicted. The master link pin 106 is a generally cylindrical rod having a distal end 136, a distal portion 137 near the distal end 136, a proximal end 138, a proximal portion 139, an outer circumferential surface 140, and threads 142 on the outer circumferential surface 140 along the distal portion 137. In a preferred embodiment, the threads 142 corresponds to the threads of each of the pin bores 118 of the master links 102, 104. In a further preferred embodiment, the threads 142 of the master link pin 106 extends from the distal end 136 toward the proximal end 138 to a distance that corresponds to the depth of the pin bore 118 of the master links 102, 104 between the lateral and medial annular recesses 122, 123. In such an embodiment, the master link pin 106 may be easily threaded through the pin bores 118 of the master links 102, 104 and lubricant 92 may be inserted between the master link pin 106 and the bushing 30, as detailed below.

While the master link pin 106 has been described as having threads 142 which corresponds to threads of the pin bores 119 of the master links 102, 104, it will be appreciated that other embodiments are contemplated. For example, the master link pin 106 may have projections which extend radially outwardly from the outer circumferential surface 140 and correspond to slots or grooves in the pin bores 118 such that the projections may be interlockingly received in the slots or grooves. Alternatively, the master link pin 106 may have any other suitable means which may interlock with the pin bores 118 of the master links 102, 104.

The distal and proximal ends 136, 138 may be substantially circular and flat, and the proximal end 138 may have a larger diameter than the outer circumferential surface 140. The master link pin 106 may also have a radial projection 144 extending outwardly from the outer circumferential surface 140 near the distal end 138. The radial projection 144 may include a projection surface 146 extending outwardly from the outer circumferential surface 140 and radial outer surface 148 substantially concentric with the outer circumferential surface 140 and extending between the projection surface 146 and the proximal end 138. In the illustrated embodiment, the projection surface 146 is perpendicular to the outer circumferential surface 140. However, it will be appreciated that other embodiments are contemplated. For example, the projection surface 146 may be angled toward the proximal end 138, angled toward the distal end 136, rounded, or any other shape which may abut the master links 102, 104 to prevent the master link pin 106 from being inserted too far through the master link box 100, as detailed below.

The master link pin 106 may also include a proximal counterbore 154 disposed in the proximal end 138 and extending into the master link pin 106. In a first exemplary embodiment, the proximal counterbore 154 is sized and shaped to facilitate placement of the master link pin 106 in the pin bores 118 of the master links 102, 104. The proximal counterbore 154 may be designed to receive the end of a tool which a user may use to thread and/or tighten the master link pin 106 in the master link box 100. For example, the master link pin 106 may be an Allen counterbore which may receive the end of an Allen wrench which a user may use to rotate and tighten the master link pin 106 in the master link box 100.

In a second exemplary embodiment, the proximal counterbore 154 is sized and shaped to prevent dirt or other debris from collecting in the master link box 100 and/or to make the proximal counterbore 154 easier to assemble. The proximal counterbore 154 may be sized and shaped to prevent dirt or other debris from accumulating between the master links 102, 104 and master link pin 106 to protect the first and second fasteners 132, 134, pressed ring 79, seal 81, and the rest of the master link box 100 or to make the master link pin 106 more economical to manufacture. The proximal counterbore 154 may be relatively conical, rounded, triangular, rectangular, pentagonal, or any other shape known in the art.

Figure 12:
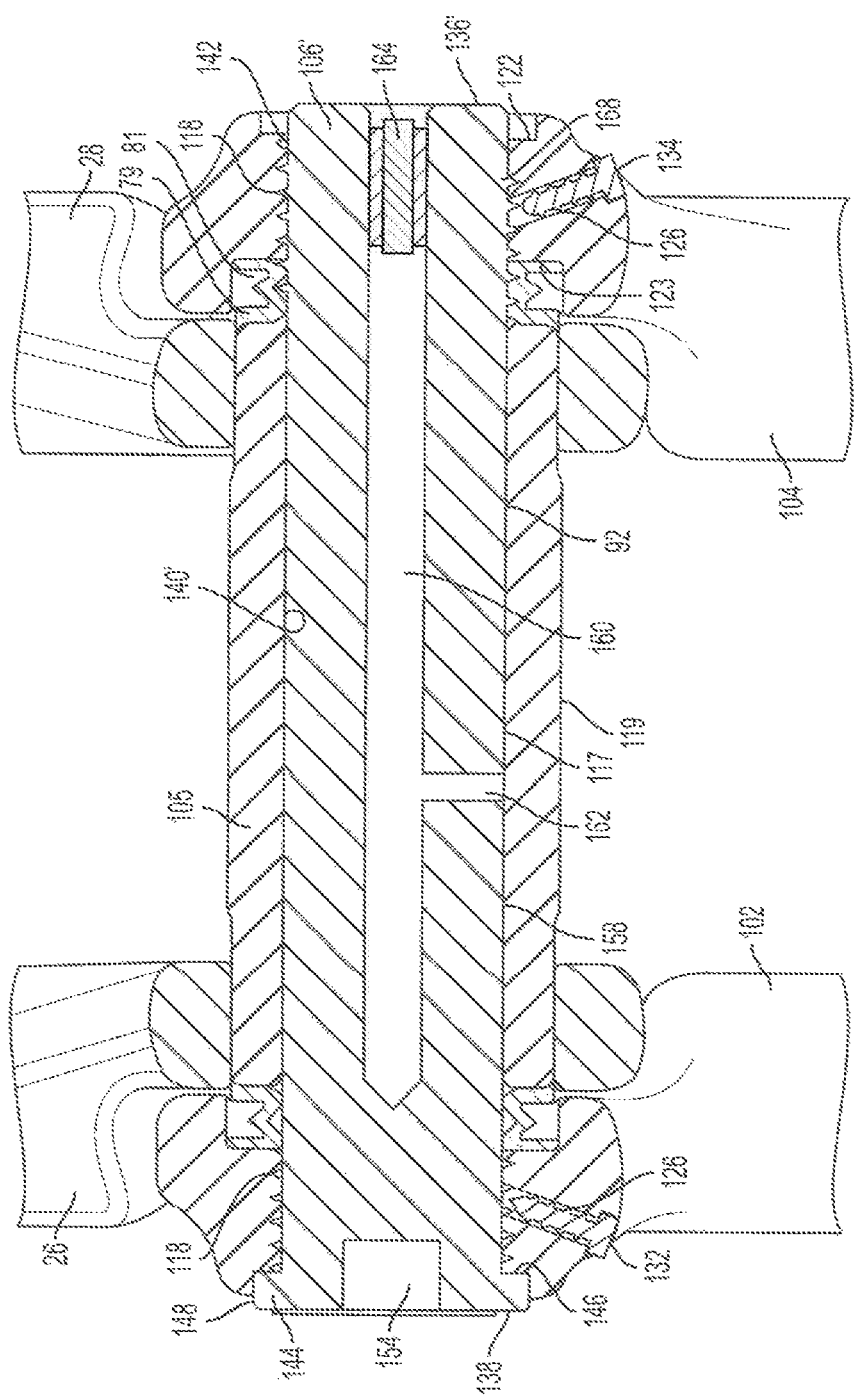
FIG. 12 is a cross-sectional view of a master link box having a master link pin with a longitudinal bore and side fluid passage.

As shown in FIG. 12, the master link pin 106' may include a longitudinal bore 160 extending longitudinally into the master link pin 106' from a distal end 136' and a side fluid passage 162 extending radially outward from the longitudinal bore 160 to an outer circumferential surface 140'. As such, the outer circumferential surface 140', the side fluid passage 162, the longitudinal bore 160, and the distal end 136' of the master link pin 106' may be fluidly connected. The master link pin 106' may also include a cap 164 which may be inserted into the longitudinal bore 160 from the distal end 136' to close off or otherwise seal the longitudinal bore 160 from the distal end 136'. In a preferred embodiment, the cap 164 is a screw or other fastener which may be threaded or otherwise secured in the longitudinal bore 160 from the distal end 136' to seal off the longitudinal bore 160.

Referring to FIGS. 6-8, the master link box 100 may be secured between the front and rear 94, 96 ends of the link assembly 86 to form the continuous track 14.

In one embodiment, the second or link seal bores 120 of the master links 102, 104 are pre-joined onto the front end 94 of the link assembly 86. The second ends 110 of the master links 102, 104 may be connected with a bushing 30 by securing the link seal bores 120 of the master links 102, 104 around the cylindrical outer surface 62 of the bushing 30. The second ends 110 of the master links 102, 104 and the bushing 30 may then be disposed between the first ends 34 of the track links 26, 28 defining the front end 94 of the link assembly 86 and a track link pin 32 may be inserted therebetween to join the front end 94 of the link assembly 86, the bushing 30, and the master links 102, 104. One or more pressed rings 79 and one or more seals 81 may be disposed between the bushing 30, the medial annular recesses 77 of the track links 26, 28, and the outer circumferential surface 68 of the track link pin. The track link pin 32 may be inserted and the master links 102, 104 may be joined to the first ends 34 of the links 26, 28 of the front link box 24 of the link assembly 86 by any other suitable means. For example, the track link pin 32 may be press-fit and sealed within the pin bores 44 of the front links 26, 28, the bushing 30, and the link seal bores 120 of the master links 102, 104.

In a further embodiment, the master link bushing 105 is pre-joined between the link seal bores 46 of the track links 26, 28 defining the rear end 96 of the link assembly 86 and the first ends 108 of the master links 102, 104 are not pre-joined to the rear end 96 of the link assembly 86. The master link bushing 105 may be secured between the link seal bores 46 of the track links 26, 28 defining the rear end 96 of the link assembly 86 by press-fitting or any other suitable means. In such an embodiment, the link assembly 86 and the master link box 100 may be wrapped around the rotatable elements 16, 18, 20, 22 of the work machine 10 and the first ends 108 of the master links 102, 104 may be subsequently joined to the rear end 96 of the link assembly 86 when the track links 26, 28 and master links 102, 104 are in place to form the continuous track 14.

To join the master link box 100 to the front and rear ends 94, 96 of the link assembly 86 to form the continuous track 14, the link seal bores 120 of the master links 102, 104 are secured to the front end 94 of the link assembly 86 by a track link pin 32 and the pin bores 118 of the master links 102, 104 are aligned with the link seal bores 46 of the first and second track links 26, 28 of the rear end 96 of the link assembly 86 with the master link bushing 105 secured therebetween. The master link pin 106 is then threaded or otherwise inserted through the pin bore 118 of either the left-hand or right-hand master link 102, 104, through the master link bushing 105 (which is disposed between the link seal bores 46 of the track links 26, 28), and into the threaded pin bore 118 of the other master link 102, 104. The master link pin 106 may be inserted into the master link box 100 until the radial projection 144 of the master link pin 106 abuts the lateral annular recess 122 of the master link 102, 104 through which the master link pin 106 was first inserted. A user may use the proximal counterbore 154 to thread or otherwise secure the master link pin 106 in the threaded pin bore 118 of the master links 102, 104. For example, a user may insert a tool, such as an Allen wrench, into the proximal counterbore 154 and rotate the tool to tighten the master link pin 106 in the master link box 100.

As shown in FIG. 8, the master link box 100 may include one or more pressed rings 79 and one or more seals 81 disposed between the medial annular recesses 123 of the master links 102, 104 and the master link bushing 105. The pressed rings 79 and seals 81 may be disposed such that the seals 81 abut the master link bushing 105 near the first and second openings 113, 115 and the pressed rings 79 bias the seals 81 into a sealing abutment with the master link bushing 105 while simultaneously protecting the seals 81 from being crushed between the master link bushing 105 and the master links 102, 104. The pressed rings 79 and seals 81 are sized to securely fit around the master link pin 106 when the master link pin 106 is inserted into the master link box 100. As a result, when the master link pin 106 is inserted in the master link box 100, a sealed link cavity 158 is formed between the cylindrical inner surface 117 of the master link bushing 105, the outer circumferential surface 140 of the master link pin 106, the pressed ring 79, and the seal 81.

The master link box 100 may also include lubricant 92 in the sealed link cavity 158. The lubricant 92 may facilitate the rotation of the master link pin 106 within the master link bushing 105, reduce friction and/or wear of the master link bushing 105 and/or master link pin 106, and reduce heat generation. In a first exemplary embodiment, after the master link pin 106 has been threaded through the threaded pin bore 118 of the left-hand or right-hand master link 102, 104 and before the second fastener 134 is inserted into the threaded passage 126 of the left-hand or right-hand master link 102, 104, as described below, the lubricant 92, such as grease, oil, or any other suitable lubricant, may be inserted into the master link box 100 through the threaded passage 126 of the master link 102, 104 through which the master link pin 106 was first threaded. The lubricant 92 may then be sealed between the master link pin 106, the master link bushing 105, and the link seal bore 46 of the track links 26, 28.

In second exemplary embodiment, such as when the lubricant 92 is oil and the master link pin 106 includes a longitudinal bore 160, a side fluid passage 162, and a cap 164, the lubricant 92 may be added through the longitudinal bore 160 of the master link pin 106, through the side fluid passage 162, and into the sealed link cavity 158 of the master link box 100. In such an embodiment, the lubricant 92 may be added at any time during the assembly of the master link box 100, such as when the master link pin 106 is fully inserted in the master link box 100 and is secured by the first and second fasteners 132, 134, as detailed below. After a sufficient amount of lubricant 92 has been added into the sealed link cavity 158 of the master link 100, the cap 164 may be inserted into the longitudinal bore 160 to seal the longitudinal bore 160 and thereby retain the lubricant 92 in the sealed link cavity 158.

Once the master link pin 106 has been fully inserted into the master link box 100 and the radial projection 144 of the master link pin 106 contacts the lateral annular recess 122 of the master link 102, 104 through which the master link pin 106 was first inserted (the left-hand master link 102 in FIGS. 8, 11, and 12), the first and second fasteners 132, 134 may be inserted into the threaded passages 126 of the master links 102, 104. The first fastener 132 may be inserted into the threaded passage 126 of the master link 102, 104 through which the master link pin 106 was first inserted (the left-hand master link 102 in FIGS. 8, 11, and 12) such that the first fastener 132 may abut the outer circumferential surface 140 of the master link pin 106 at the proximal portion 139. The second fastener 134 may be inserted into the threaded passage 126 of the master link 102, 104 through which the master link pin 106 was inserted second (the right-hand master link 104 in FIGS. 8, 11, and 12), such that the second fastener 134 may abut the outer circumferential surface 140 of the master link pin 106 at the distal portion 137. The abutment between the master link pin 106 and the first and/or second fasteners 132, 134 may prevent the master link pin 106 from retracting or otherwise backing out of the master link box 100. As such, the master link pin 106 may be inserted into and secured in the master link box 100 from either side of the master link box 100.

Figure 10:
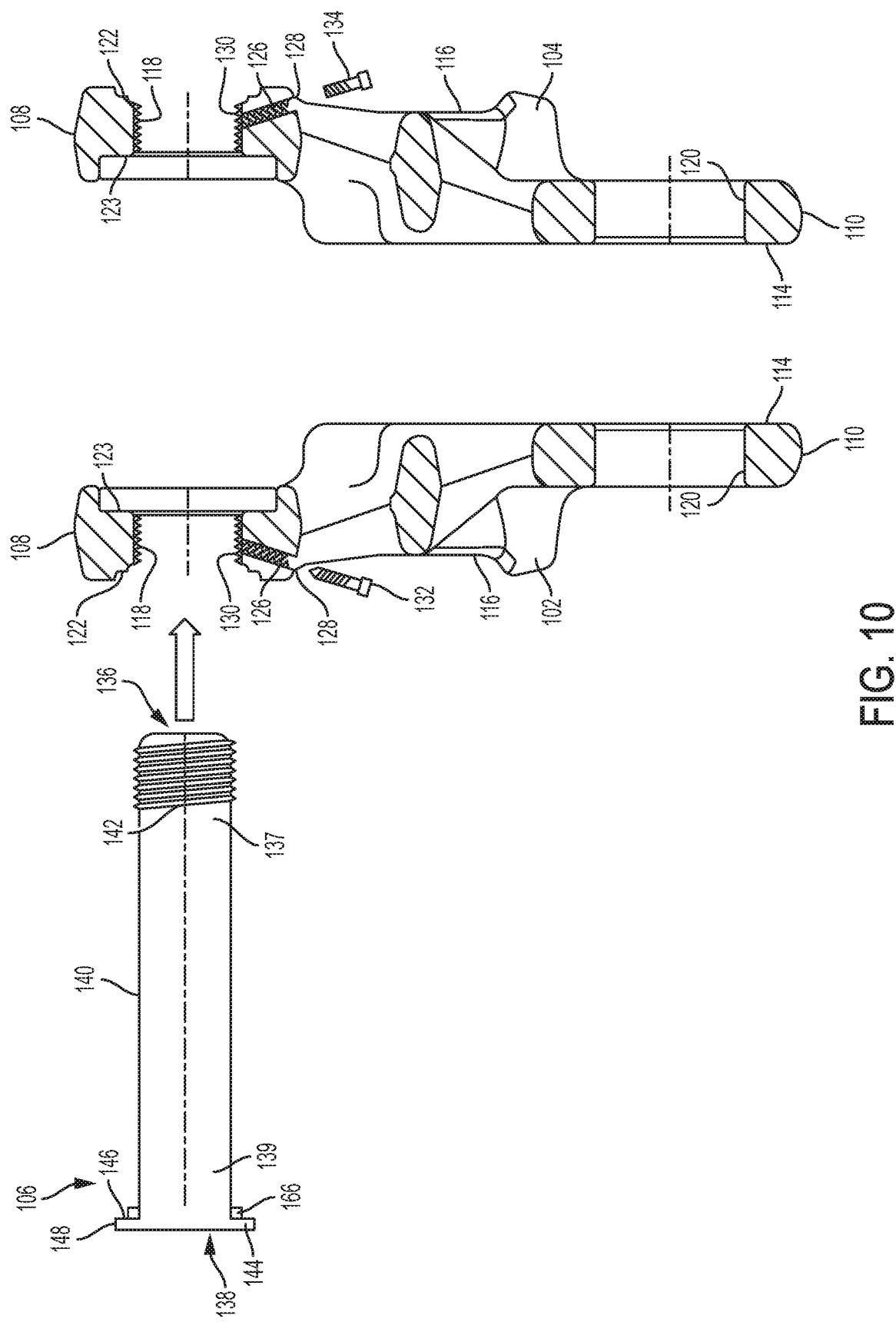
FIG. 10 is an exploded cross-sectional view the master link box of FIG. 9.

As shown in FIG. 10, the master link box 100 may also include a sealing ring 166 disposed on the outer circumferential surface 140 of the master link pin 106 near the radial projection 144. When the master link box 100 is assembled, the sealing ring 166 may be pressed or otherwise disposed between the radial projection 144 of the master link pin 106 and the lateral annular recess 122 of the master link 102, 104 through which the master link pin 106 was first inserted to form a seal between the master link pin 106 and the master link 102, 104. The sealing ring 166 may be any compressible material which may form a fluid seal when compressed between the master link 102, 104 and master link pin 106. For example, the sealing ring 166 may be an elastomeric O-ring. However, the sealing ring 166 may be any other suitable type of partially compressible sealing ring.

Figure 11:
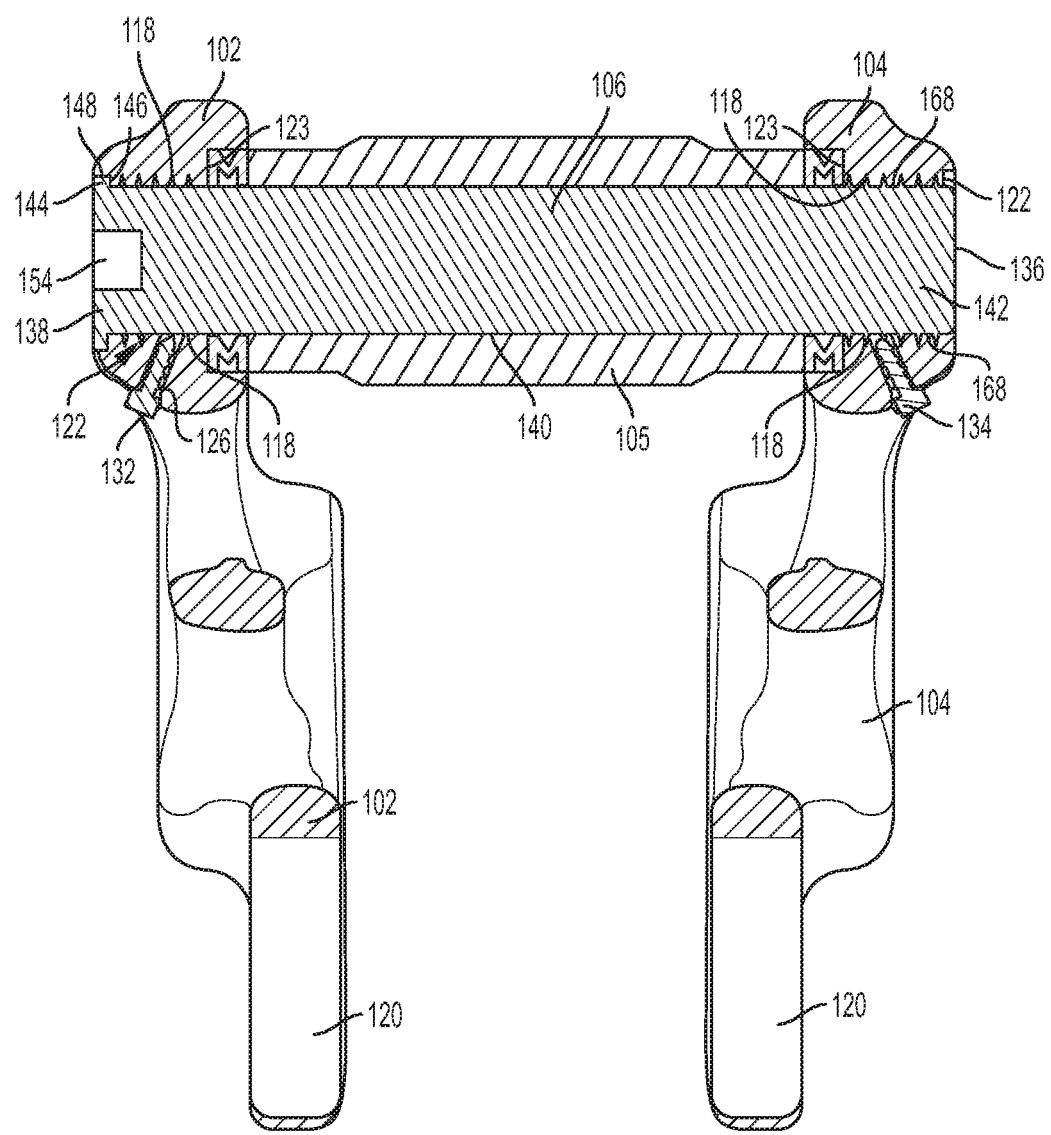
FIG. 11 is a cross-sectional view of the master link box of FIG. 9.

As shown in FIGS. 11 and 12, the master link box 100 may further include a pipe joint compound 168 applied to the threaded pin bores 118 of the master link 102, 104 through which the master link pin 106 was inserted second (the right-hand master link 104 in FIGS. 11-12) and/or the threads 142 of the master link pin 106. The pipe joint compound 168 may be any compound which permits threading between the master link pin 106 and the master links 102, 104 and also provides an effective fluid seal when solidified. When the master link pin 106 is threaded into the pin bores 118 of the master links 102, 104, the pipe joint compound 168 may provide an effective seal between the threads 142 of the master link pin 106 and the pin bores 118 of the master links 102, 104 and prevents the lubricant 92 from weeping or otherwise escaping between the master link bushing 105, the master link pin 106, and the master links 102, 104.

INDUSTRIAL APPLICABILITY

The disclosed master link box 100 may be integrated with tracks 14 of many work machines where durability of the track 14 is required including, but not limited to, a track-type tractor, a half-track machine, an excavator, a tank, some other type of mobile machine, or even a stationary machine such as a conveyor. By incorporating the disclosed master link box 100 of the present disclosure, the durability of the continuous tracks 14 may be improved and the continuous tracks 14 may be repaired or replaced less frequently. Further, when the master link box 100 is included at the ends 94, 96 of the link assembly 86, the ends 94, 96 of the link assembly 86 may be joined together to form a continuous track 14 without the use of a hydraulic press or other complicated and/or relatively immovable tool. Moreover, where the master link box 100 is employed, the continuous track 14 may be secured around the rotatable elements 16, 18, 20, 22 of the work machine 10 from either the outside or inside of work machine 10 for either the left or right continuous track 14.

The inventive master link box 100 includes master links 102, 104 with threaded pin bores 118 and a master link pin 106 with threads 142 disposed near on the outer circumferential surface 140 near the distal end 136. The threads 142 of the master link pin 106 may easily be threaded through the threaded pin bore 118 of either master link 102, 104, through the bushing 30, and into the threaded pin bore 118 of the other master link 102, 104. Also, the master link pin 106 includes a radial projection 144 and the master links 102, 104 include lateral annular recesses 122 disposed around the outside of the pin bores 118. The radial projection 144 may abut the lateral annular recess 122 of one of the master links 102, 104 when the master link pin 106 is fully inserted into master link box 100 and prevents the master link pin 106 from being inserted too far through the master links 102, 104. Further, the master link pin 106 includes a proximal counterbore 154 in the proximal end 138 which a user may use to tighten or otherwise secure the master link pin 106 in or through the threaded pin bores 118 of the master links 102, 104. As such, the master link pin 106 may be easily inserted into the master link box 100 to secure the master left-hand and master right-hand links 102, 104 without the use of alignment tools or a hydraulic press.

The master link box 100 includes left-hand and right-hand master links 102, 104 with threaded passages 126. The threaded passages 126 may each retain either of a first or second fastener 132, 134 such that the first or second fastener 132, 134 may at least partially extend into the threaded pin bore 118 of the master links 102, 104. The portions of the first and second fasteners 132, 134 extending into the threaded pin bores 118 may abut the master link pin 106 when the master link pin 106 threadingly joins the master links 102, 104. The first threaded fastener 132 may abut the outer circumferential surface 140 of the master link pin 106 at the proximal portion 13 and the second fastener 134 may abut the outer circumferential surface 140 of the master link pin 106 at the distal portion 137 to prevent the master link pin 106 from being retracted from the threaded pin bores 118 of the master links 102, 104.

The master link pin 106 includes threads 142 near the distal end 136 of the master link pin 106 which corresponds to the threads of the pin bores 118 of the left-hand and right-hand master links 102, 104 such that the master link pin 106 may be inserted into the master link box 100 through either the left-hand master link 102 or the right-hand master link 104. Also, the threaded passages 126 of the master links 102, 104 may retain either of the first or second fasteners 132, 134. As such, the first fastener 132 may be threaded into the threaded passage 126 of either the left-hand master link 102 or the right-hand master link 104 to abut the outer circumferential surface 140 of the master link pin 106 near the proximal end 138 and the second fastener 134 may be inserted into the threaded passage 126 of either the left-hand master link 102 or the right-hand master link 104 to abut the outer circumferential surface 140 of the master link pin 106 near the distal end 136. Accordingly, the master link pin 106 may be inserted into the master link box 100 to secure the master link box 100 and the continuous track 14 from either side of the master link box 100.

Because the master link pin 106 may be inserted first through the either the left-hand or right-hand master link 102, 104, through the remainder of the master link box 100, and then secured by the first and second fasteners 132, 134 from either side of the master link box 100, the master link box 100 may be assembled from either the outside or inside of the track 14. This ability to assemble the master link box 100 from either side of the track 14 makes the assembly of the link assembly 86 into the continuous track 14 easier, particularly as assembly or reassembly of the master link box 100 in the field may be required with the master link box 100 at various positions on the track 14.

In view of the many possible embodiments to which the principles of the disclosure can be applied, it should be recognized that the illustrated embodiments are only preferred examples and should not be taken as limiting the scope of the disclosure. Rather the scope of the disclosure is defined by the following claims.

It will be appreciated that the foregoing description provides examples of the disclosed apparatus and system. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

What is claimed is:

1. A master link box for a continuous track of a work machine, the master link box comprising:
   a left-hand master link having a first end, a second end, a first pin bore extending through the first end, a first link seal bore extending through the second end, a first distal surface, and a first threaded passage extending from the first distal surface to the first pin bore;
   a right-hand master link having a third end, a fourth end, a second pin bore extending through the third end, a second link seal bore extending through the fourth end, a second distal surface, and a second threaded passage extending from the second distal surface to the second pin bore;
   a master link pin having a distal portion, a proximal portion, an outer circumferential surface, and threads disposed on the outer circumferential surface;
   a first fastener receivable in the first threaded passage to abut the outer circumferential surface of the master link pin; and
   a second fastener receivable in the second threaded passage to abut the outer circumferential surface of the master link pin.

2. The master link box of claim 1, wherein the threads of the master link pin are disposed on the outer circumferential surface of the distal portion and are configured to threadably engage either the first pin bore or the second pin bore.

3. The master link box of claim 1, wherein the first fastener abuts the proximal portion of the master link pin.

4. The master link box of claim 3, wherein the first fastener has an end terminating at a point.

5. The master link box of claim 1, wherein the second fastener abuts the distal portion of the master link pin.

6. The master link box of claim 5, wherein the second fastener is a screw has a flat end.

7. A master link box for a continuous track of a work machine, the master link box comprising:
   a left-hand master link having a first end, a second end, a first threaded pin bore extending through the first end, and a first link seal bore extending through the second end;
   a right-hand master link having a third end, a fourth end, a second threaded pin bore extending through the third end, and a second link seal bore extending through the fourth end;
   a master link pin extending through the first threaded pin bore and the second threaded pin bore, the master link pin having a distal portion, a proximal portion, an outer circumferential surface, and threads disposed on the outer circumferential surface of the distal portion, the threads configured to mate with both the first threaded pin bore and the second threaded pin bore;
   a passage extending from at least one of an exterior surface on the left-hand master link to the first threaded pin bore and an exterior surface on the right-hand master link to the second threaded pin bore; and
   a fastener receivable in the passage.

8. The master link box of claim 7, wherein the master link pin is configured to be inserted through either the left-hand master link or the right-hand master link.

9. The master link box of claim 7, wherein the threads of the master link pin extend along the outer circumferential surface to a distance equivalent to a depth of one of the first threaded pin bore or the second threaded pin bore.

10. The master link box of claim 7, further comprising a proximal counterbore disposed in the proximal portion of the master link pin configured to receive a tool for inserting the master link pin in the first and second threaded pin bores.

11. The master link box of claim 10, wherein the proximal counterbore is configured to receive an Allen head.

12. The master link box of claim 7, wherein the passage is threaded.

13. The master link box of claim 12, wherein the passage extends radially from the exterior surface of the left hand master link to the first threaded pin bore and wherein the master link box further comprises a second threaded passage extending radially from an exterior surface on the right-hand master link to the second threaded pin bore and a second fastener receivable in the second threaded passage.

14. The master link box of claim 13, wherein the second fastener abuts the master link pin when the second fastener is received in the second threaded passage.

15. The master link box of claim 7, wherein the fastener abuts the master link pin when the fastener is received in the passage.

16. A method for forming a continuous track for a work machine, the method comprising:
   providing a plurality of track link boxes forming a link assembly having a first end and a second end;
   providing a master link box between the first end and the second end of the link assembly, the master link box including a left-hand master link having a first pin bore, a first link seal bore, and a first threaded passage, and a right-hand master link having a second pin bore, a second link seal bore, and a second threaded passage, a master link bushing;
   securing the first and second link seal bores to the first end of the link assembly;

securing a master link bushing between two link seal bores of a track link box defining the second end of the link assembly;

aligning the first pin seal bore and second pin bore with the master link bushing;

inserting a master link pin through one of the first pin bore and the second pin bore, through the master link bushing, and into the other of the first pin bore and second pin bore;

inserting a first fastener into a first threaded passage of the left-hand master link such that the first fastener abuts the master link pin; and inserting a second fastener into a second threaded passage of the right-hand master link such that the second fastener abuts the master link pin.

17. The method of claim 16, wherein the master link pin is inserted into the master link box until a radial projection of the master link pin abuts an annular recess of one of the master links.

18. The method of claim 16, wherein the master link pin threadingly engages one of the first pin bore and the second pin bore.

19. The method of claim 16, wherein the master link pin includes threads along a distal portion and the first fastener abuts the threads.

20. The method of claim 19, wherein the second fastener abuts an outer circumferential surface of the master link pin that is free of threads.

* * * * *